United States Patent
Jiang et al.

(10) Patent No.: US 10,476,549 B1
(45) Date of Patent: Nov. 12, 2019

(54) TRANSMITTER LINEARITY BUILT-IN-SELF-TEST

(71) Applicant: Futurewei Technologies, Inc., Plano, TX (US)

(72) Inventors: Hong Jiang, Kernersville, NC (US); Wael Al-Qaq, Oak Ridge, NC (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/971,841

(22) Filed: May 4, 2018

(51) Int. Cl.
    H04B 3/46 (2015.01)
(52) U.S. Cl.
    CPC .................................. H04B 3/46 (2013.01)
(58) Field of Classification Search
    None
    See application file for complete search history.

(56) References Cited

U.S. PATENT DOCUMENTS

| | | | | |
|---|---|---|---|---|
| 3,902,811 A | * | 9/1975 | Altman | G01B 11/022 356/398 |
| 5,268,893 A | * | 12/1993 | Call | G11B 7/126 369/116 |
| 5,940,065 A | * | 8/1999 | Babb | G06F 3/045 345/178 |
| 6,263,289 B1 | | 7/2001 | Hassun et al. | |
| 6,506,983 B1 | * | 1/2003 | Babb | G06F 3/045 178/18.01 |
| 6,567,762 B2 | * | 5/2003 | Bourde | G01R 23/20 702/107 |
| 6,876,839 B2 | * | 4/2005 | Harris | H03D 7/161 455/141 |

(Continued)

FOREIGN PATENT DOCUMENTS

| | | |
|---|---|---|
| CN | 207198236 U | 4/2018 |
| EP | 3297160 A1 | 3/2018 |

(Continued)

OTHER PUBLICATIONS

Introduction to UMTS Device Testing, Transmitter and Receiver Measurements for WCDMA Devices, httpwww.ni. xmrf-academy. National Instruments, 63 pages.*

(Continued)

*Primary Examiner* — Berhanu Tadese
(74) *Attorney, Agent, or Firm* — Vierra Magen Marcus LLP

(57) ABSTRACT

An apparatus for testing a circuit includes a source signal input configured to receive a source signal, an evaluation signal input configured to receive an evaluation signal, and a coefficient extractor configured to extract a plurality of coefficients of a preselected polynomial representing the evaluation signal and the source signal. A weight factor storage contains a plurality of weight factors corresponding to frequency filters. An Adjacent Channel Power Ratio (ACPR) calculator is configured to calculate an ACPR value from the evaluation signal and the source signal by applying the plurality of weight factors from the weight factor storage to the plurality of coefficients the plurality of weight factors selected according to a main channel frequency range and an adjacent channel frequency range, and determining whether the ACPR value is within an acceptable range and generating a corresponding indication.

20 Claims, 8 Drawing Sheets

(56) References Cited

U.S. PATENT DOCUMENTS

| | | | | |
|---|---|---|---|---|
| 8,150,356 | B2* | 4/2012 | Keehr | H04B 1/109 455/295 |
| 8,233,871 | B2* | 7/2012 | Keehr | H04B 1/109 330/124 R |
| 8,271,223 | B2* | 9/2012 | Rawlins | H03F 1/0211 702/90 |
| 8,290,449 | B2* | 10/2012 | Keehr | H04B 1/123 330/149 |
| 8,331,897 | B2* | 12/2012 | Kim | H03D 7/163 455/323 |
| 8,548,403 | B2* | 10/2013 | Kim | H03F 1/3247 455/114.3 |
| 9,176,188 | B2* | 11/2015 | Chakraborty | G01R 31/31716 |
| 9,217,797 | B2* | 12/2015 | Tulett | G01V 1/0475 |
| 9,311,202 | B2* | 4/2016 | Wang | G06F 11/263 |
| 9,444,559 | B2* | 9/2016 | Jiang | H04B 17/0085 |
| 9,998,242 | B2* | 6/2018 | Jiang | H04B 17/0085 |
| 2002/0082792 | A1* | 6/2002 | Bourde | G01R 23/20 702/107 |
| 2002/0132337 | A1* | 9/2002 | Rong | A61K 39/255 435/235.1 |
| 2002/0172410 | A1* | 11/2002 | Shepard | G01N 25/72 382/141 |
| 2003/0032398 | A1* | 2/2003 | Harris | H03D 7/161 455/147 |
| 2003/0210093 | A1* | 11/2003 | Zhang | H03F 1/3282 330/149 |
| 2004/0198232 | A1* | 10/2004 | Fu | H04W 52/16 455/67.11 |
| 2005/0008215 | A1* | 1/2005 | Shepard | G01N 25/72 382/141 |
| 2005/0084070 | A1* | 4/2005 | Chretien | H05G 1/34 378/111 |
| 2005/0118620 | A1* | 6/2005 | Vess | C12Q 1/6851 435/6.16 |
| 2005/0192492 | A1* | 9/2005 | Cho | A61B 5/01 600/316 |
| 2005/0218991 | A1* | 10/2005 | Birbeck | H03C 1/36 330/296 |
| 2006/0066394 | A1* | 3/2006 | Eckl | H03F 1/32 330/2 |
| 2006/0145757 | A1* | 7/2006 | Kim | H03F 1/0288 330/124 R |
| 2006/0265167 | A1* | 11/2006 | Laraia | G01D 3/0365 702/99 |
| 2008/0221822 | A1* | 9/2008 | Laverdiere | G01F 1/34 702/100 |
| 2009/0063081 | A1* | 3/2009 | Xu | G01D 3/022 702/107 |
| 2009/0075612 | A1* | 3/2009 | Keehr | H03D 7/14 455/226.1 |
| 2009/0095896 | A1* | 4/2009 | Kurata | G01N 30/34 250/281 |
| 2009/0145195 | A1* | 6/2009 | Buttmann | G01D 18/008 73/1.03 |
| 2009/0179773 | A1* | 7/2009 | Denny | G06T 7/80 340/901 |
| 2009/0186587 | A1* | 7/2009 | Sobchak | H04B 1/30 455/196.1 |
| 2009/0252252 | A1* | 10/2009 | Kim | H03D 7/163 375/268 |
| 2010/0093298 | A1* | 4/2010 | Pratt | H04B 1/109 455/226.1 |
| 2010/0176981 | A1* | 7/2010 | Keehr | H04B 1/109 341/155 |
| 2010/0309952 | A1* | 12/2010 | Asami | G01R 23/20 375/132 |
| 2010/0310006 | A1* | 12/2010 | Asami | G01R 31/31908 375/296 |
| 2010/0312515 | A1* | 12/2010 | Miyasaka | G01R 31/2839 702/106 |
| 2010/0316172 | A1* | 12/2010 | Keehr | H04B 1/109 375/344 |
| 2011/0151792 | A1* | 6/2011 | Kushnir | H04B 1/109 455/63.1 |
| 2012/0049961 | A1* | 3/2012 | Ripley | H03G 3/007 330/278 |
| 2012/0100897 | A1* | 4/2012 | Chen | H03F 1/0244 455/574 |
| 2013/0084852 | A1* | 4/2013 | Duperray | H04B 17/19 455/425 |
| 2013/0204508 | A1* | 8/2013 | Whitt | F02D 41/1446 701/102 |
| 2013/0214861 | A1* | 8/2013 | Kim | H03F 1/3247 330/149 |
| 2013/0259154 | A1* | 10/2013 | Ishikawa | H04B 15/00 375/296 |
| 2014/0016723 | A1* | 1/2014 | Mu | H04B 1/62 375/296 |
| 2014/0062603 | A1* | 3/2014 | Xue | H03F 1/0288 330/295 |
| 2014/0355456 | A1* | 12/2014 | Jiang | H04B 17/0085 370/252 |
| 2015/0177326 | A1* | 6/2015 | Chakraborty | G01R 31/31716 375/224 |
| 2015/0177994 | A1* | 6/2015 | Vucinic | G06F 3/0613 711/103 |
| 2015/0288467 | A1* | 10/2015 | Kahrizi | H04B 17/21 370/241 |
| 2015/0311989 | A1* | 10/2015 | Richmond | H04B 17/21 375/224 |
| 2016/0080018 | A1* | 3/2016 | Sankaranarayanan | H04B 1/123 375/351 |
| 2016/0087660 | A1 | 3/2016 | Dunsmore | |
| 2016/0204881 | A1* | 7/2016 | Chung | H04B 17/00 455/67.14 |
| 2016/0294587 | A1* | 10/2016 | Jiang | H03F 3/2173 |
| 2016/0365933 | A1* | 12/2016 | Jiang | H04B 17/0085 |
| 2017/0163358 | A1* | 6/2017 | Wadell | H04B 17/0085 |
| 2017/0288790 | A1* | 10/2017 | Haub | H04B 17/14 |
| 2018/0262220 | A1* | 9/2018 | Jimenez | H04B 1/04 |
| 2018/0331770 | A1* | 11/2018 | Dunsmore | H04B 17/318 |
| 2019/0028131 | A1* | 1/2019 | Wang | H03H 17/0261 |

FOREIGN PATENT DOCUMENTS

| | | |
|---|---|---|
| JP | 2007081731 A | 3/2007 |
| JP | 2007089052 A | 4/2007 |

OTHER PUBLICATIONS

Introduction to UMTS Device Testing, Transmitter and Receiver Measurements for WCDMA Devices, http://www.ni.com/rf-academy, National Instruments, 63 pages.

International Search Report dated Aug. 9, 2019, in PCT Patent Application No. PCT/CN2019/085449, 10 pages.

* cited by examiner

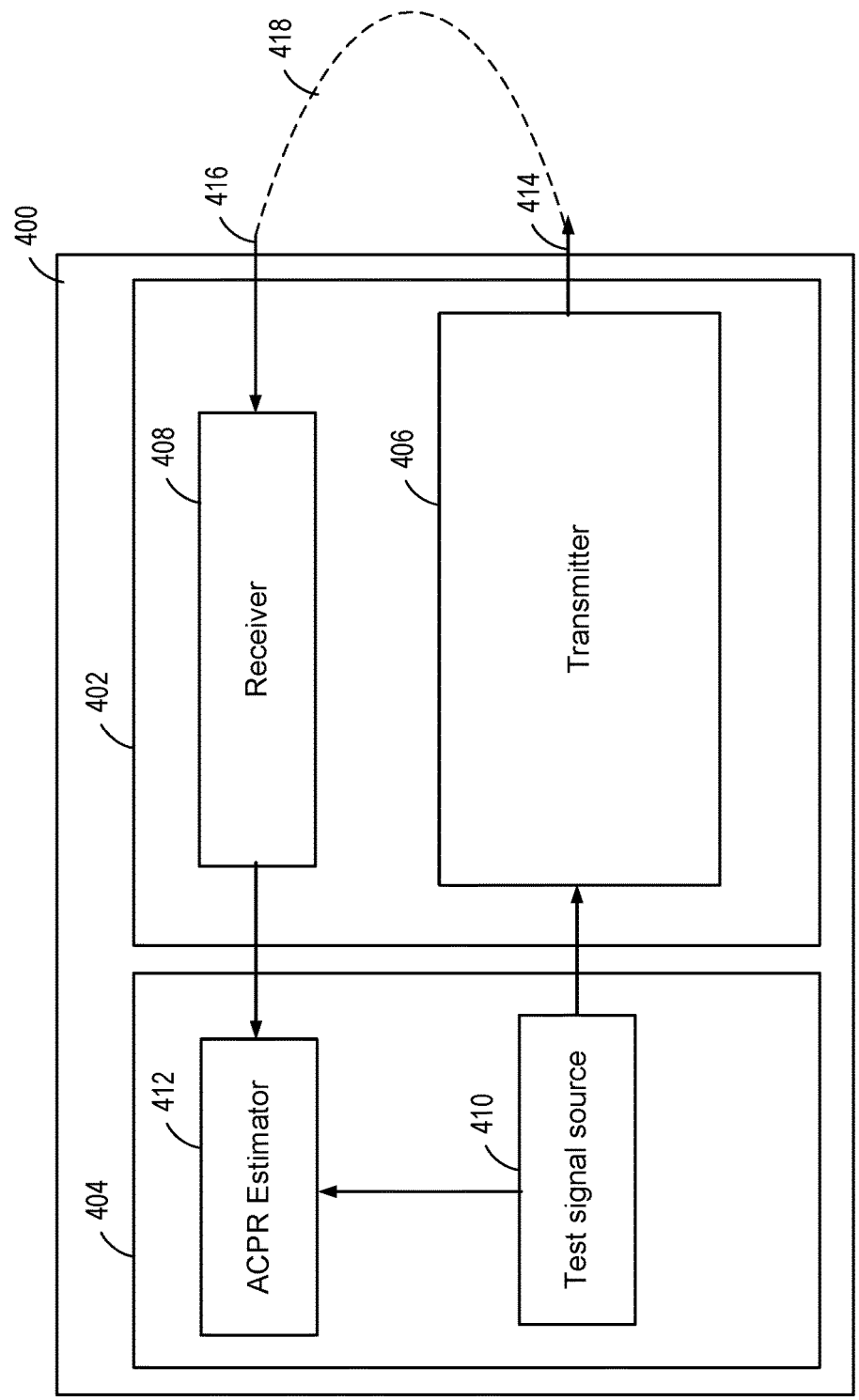

Figure 7

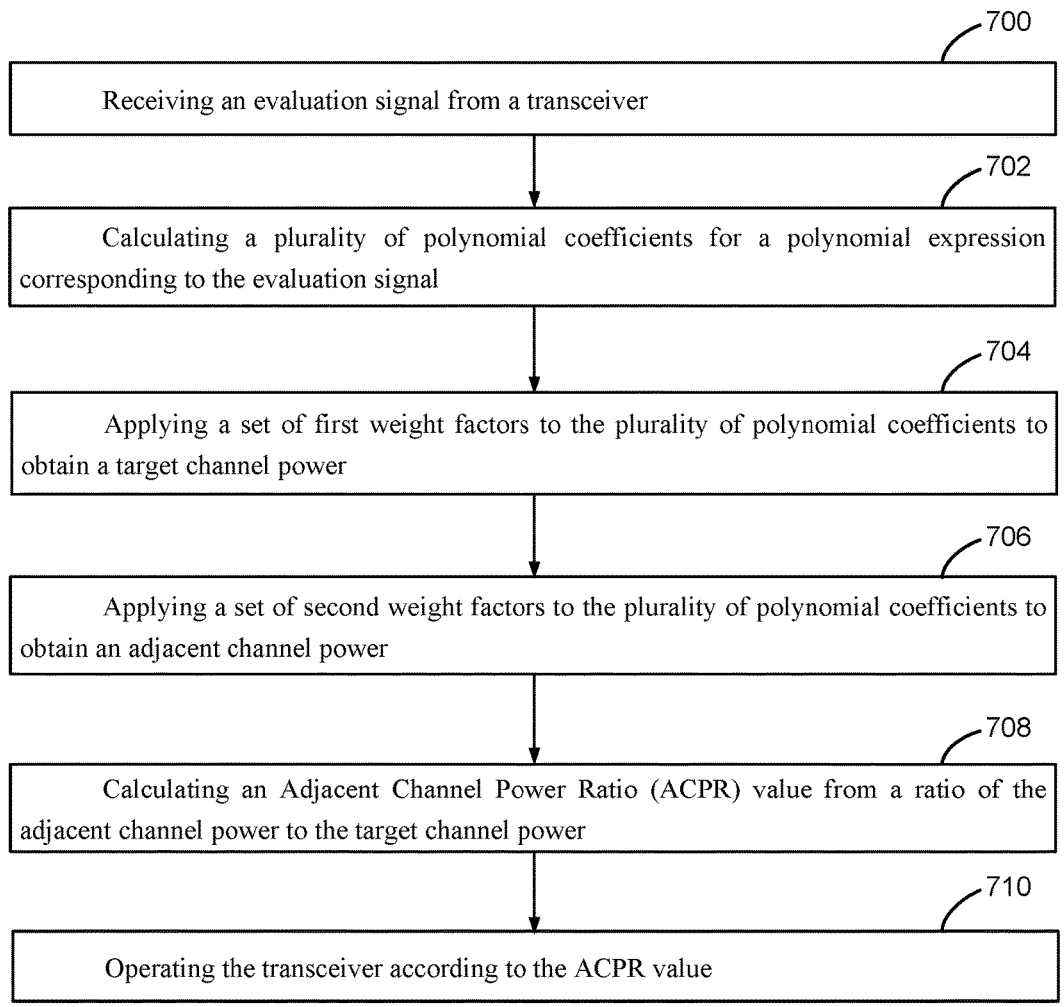

700 — Receiving an evaluation signal from a transceiver

702 — Calculating a plurality of polynomial coefficients for a polynomial expression corresponding to the evaluation signal 704 — Applying a set of first weight factors to the plurality of polynomial coefficients to obtain a target channel power 706 — Applying a set of second weight factors to the plurality of polynomial coefficients to obtain an adjacent channel power 708 — Calculating an Adjacent Channel Power Ratio (ACPR) value from a ratio of the adjacent channel power to the target channel power 710 — Operating the transceiver according to the ACPR value

TRANSMITTER LINEARITY BUILT-IN-SELF-TEST

FIELD

The following is related generally to the field of electronic testing.

BACKGROUND

Electronic components, including integrated circuits, may be subject to testing prior to use, or during use, in order to ensure that they meet one or more predefined standards. Electronic components that fail to meet one or more such standard may be discarded (scrapped). In some cases, test results may be used to categorize (bin) electronic components into different categories that may be sold accordingly.

Testing may be performed by external testing equipment that is connected to an Integrated Circuit (IC) in a test facility. In some cases, instead of using such external test equipment, or in addition to using external test equipment, some testing may be performed by test circuits that are formed as part of an IC that is to be tested. Such Built-In Self-Test (BIST) circuits allow an IC to test itself and can save cost and time associated with maintaining a dedicated test facility with a large amount of test equipment.

Transceiver circuits typically include a transmitter side and a receiver side that may be tested together by coupling an output of the transmitter side to an input of the receiver side. Various metrics may be used when testing a transceiver.

SUMMARY

According to one aspect of the present disclosure, there is provided an apparatus for testing a circuit, comprising a source signal input configured to receive a source signal; an evaluation signal input configured to receive an evaluation signal; a coefficient extractor configured to extract a plurality of coefficients of a preselected polynomial representing the evaluation signal and the source signal; a weight factor storage containing a plurality of weight factors corresponding to statistics of the modulated signals with filtering; an Adjacent Channel Power Ratio (ACPR) calculator configured to calculate an ACPR value from the evaluation signal and the source signal by applying the plurality of weight factors from the weight factor storage to the plurality of coefficients the plurality of weight factors selected according to a main channel frequency range and an adjacent channel frequency range; and determining whether the ACPR value is within an acceptable range and generating a corresponding indication.

Optionally, in any of the preceding aspects, another implementation of the aspect provides that the evaluation signal input is coupled to receive the evaluation signal from an output of a transceiver circuit located on a die, and wherein the coefficient extractor, the weight factor storage, and the ACPR calculator are formed on the die.

Optionally, in any of the preceding aspects, another implementation of the aspect provides a time alignment circuit configured to provide time alignment between the source signal from the source signal input and the evaluation signal from the evaluation signal input and to provide time-adjusted signals to the coefficient extractor.

Optionally, in any of the preceding aspects, another implementation of the aspect provides a comparison circuit configured to compare the ACPR value from the ACPR calculator with an ACPR threshold.

Optionally, in any of the preceding aspects, another implementation of the aspect provides that the plurality of weight factors include a first set of weight factors corresponding to a main channel and a second set of weight factors corresponding to an adjacent channel.

Optionally, in any of the preceding aspects, another implementation of the aspect provides that the ACPR calculator is configured to calculate the ACPR value by applying the first set of weight factors to the plurality of coefficients to obtain main channel power, apply the second set of weight factors to the plurality of coefficients to obtain adjacent channel power, and to calculate the ACPR value from a ratio of the adjacent channel power to the main channel power.

Optionally, in any of the preceding aspects, another implementation of the aspect provides a two-tone source signal generator connected to the source signal input to provide a two-tone source signal to the source signal input, the two-tone source signal generator further coupled to provide the two-tone source signal to a transceiver input of a transceiver, an output of the transceiver coupled to provide the evaluation signal to the evaluation signal input.

Optionally, in any of the preceding aspects, another implementation of the aspect provides that the two-tone source signal generator is configured to provide the two-tone source signal with a first tone at a first frequency and a second tone at a second frequency, the ACPR calculator configured to calculate the ACPR value for a main channel extending between the first frequency and the second frequency.

Optionally, in any of the preceding aspects, another implementation of the aspect provides that the transceiver includes a transmitter and a receiver, the transceiver input connected to an input of the transmitter, an output of the transmitter coupled to an input of the receiver, and an output of the receiver connected to provide the evaluation signal to the evaluation signal input.

Optionally, in any of the preceding aspects, another implementation of the aspect provides that the transceiver is formed of one or more analog circuits, the two-tone source signal generator is formed of one or more digital circuits coupled to the transceiver through one or more digital-to-analog converters, and the ACPR calculator is formed of one or more digital circuits coupled to the transceiver through one or more analog-to-digital converters.

According to one aspect of the present disclosure, there is provided an apparatus for testing a circuit, comprising: a transceiver having a transceiver input and a transceiver output; a two-tone source coupled to the transceiver input; and an adjacent channel power ratio (ACPR) estimator coupled to the transceiver output and coupled to the two-tone source, the ACPR estimator configured to calculate coefficients of a predetermined polynomial representation of an output signal of the transceiver output, to apply stored weight factors to the coefficients to calculate an ACPR value the stored weight factors corresponding to a main channel frequency range and an adjacent channel frequency range, and to determine whether the ACPR is within an acceptable range and generate a corresponding indicator.

Optionally, in any of the preceding aspects, another implementation of the aspect provides that the two-tone source and the ACPR estimator are formed on a transceiver die that includes the transceiver, the two-tone source and the ACPR estimator coupled to the transceiver as Built-In-Self-Test (BIST) circuits of the transceiver die.

Optionally, in any of the preceding aspects, another implementation of the aspect provides that the transceiver is formed in an analog portion of the transceiver die and the two-tone source and the ACPR estimator are formed in a digital portion of the transceiver die.

Optionally, in any of the preceding aspects, another implementation of the aspect provides that the transceiver includes a transmitter and a receiver, the transmitter has an output coupled through a switch to an input of the receiver to switchably couple a transmitter output signal to the input of the receiver.

Optionally, in any of the preceding aspects, another implementation of the aspect provides a pass/fail determination circuit coupled to the ACPR estimator, the pass/fail determination circuit configured to compare the ACPR value from the ACPR estimator with a threshold and to designate the transceiver as failed when the ACPR value is below the threshold.

According to one aspect of the present disclosure, there is provided a method of testing a circuit, comprising: receiving an evaluation signal from the transceiver; calculating a plurality of polynomial coefficients for a preselected polynomial expression corresponding to the evaluation signal; selecting a set of first weight factors according to a main channel frequency range; applying the set of first weight factors to the plurality of polynomial coefficients to obtain a main channel power; selecting a set of second weight factors according to an adjacent channel frequency range; applying the set of second weight factors to the plurality of polynomial coefficients to obtain an adjacent channel power; calculating an Adjacent Channel Power Ratio (ACPR) value from a ratio of the adjacent channel power to the main channel power; and determining whether the ACPR value is within an acceptable range and generating a corresponding indicator.

Optionally, in any of the preceding aspects, operating the transceiver according to the ACPR value includes comparing the ACPR value with a threshold and categorizing the transceiver accordingly into a category from a plurality of categories that includes at least: pass and fail.

Optionally, in any of the preceding aspects, the method includes categorizing the transceiver into a fail category according to the ACPR value above the threshold and in response discarding the transceiver.

Optionally, in any of the preceding aspects, the method includes categorizing the transceiver into a pass category according to the ACPR value below the threshold and subsequently incorporating the transceiver in an assembly.

Optionally, in any of the preceding aspects, the method includes applying one or more corrective steps to correct for filtering in the transceiver.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 4A shows an example including BIST circuits with ACPR estimation.

FIG. 7 illustrates an example of a method that includes calculating an ACPR value.

DETAILED DESCRIPTION

The present disclosure will now be described with reference to the figures, which in general relate to BIST circuits that may be used for testing, such as testing of an integrated circuit (IC) or complete transceiver (TX) path that includes a transceiver, without requiring external test equipment (although external test equipment may also be used in some cases). In general, in transceiver circuits it is desirable that signal power is confined to a particular frequency range (main channel) and that signal power in adjacent channels is minimized. ACPR is the ratio of power in an adjacent channel to power in a main channel and provides a measure of how much power is lost from the main channel to adjacent channels, e.g. in a transceiver circuit, or in components of a transceiver circuit. A low ACPR is generally desirable and a high ACPR is generally undesirable. ACPR may provide a metric that is used to indicate whether an IC passes or fails testing (e.g. whether a particular IC should be scrapped or incorporated in a product), or otherwise categorize an IC, or otherwise operate the transceiver according to the ACPR value.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Figure 1A:
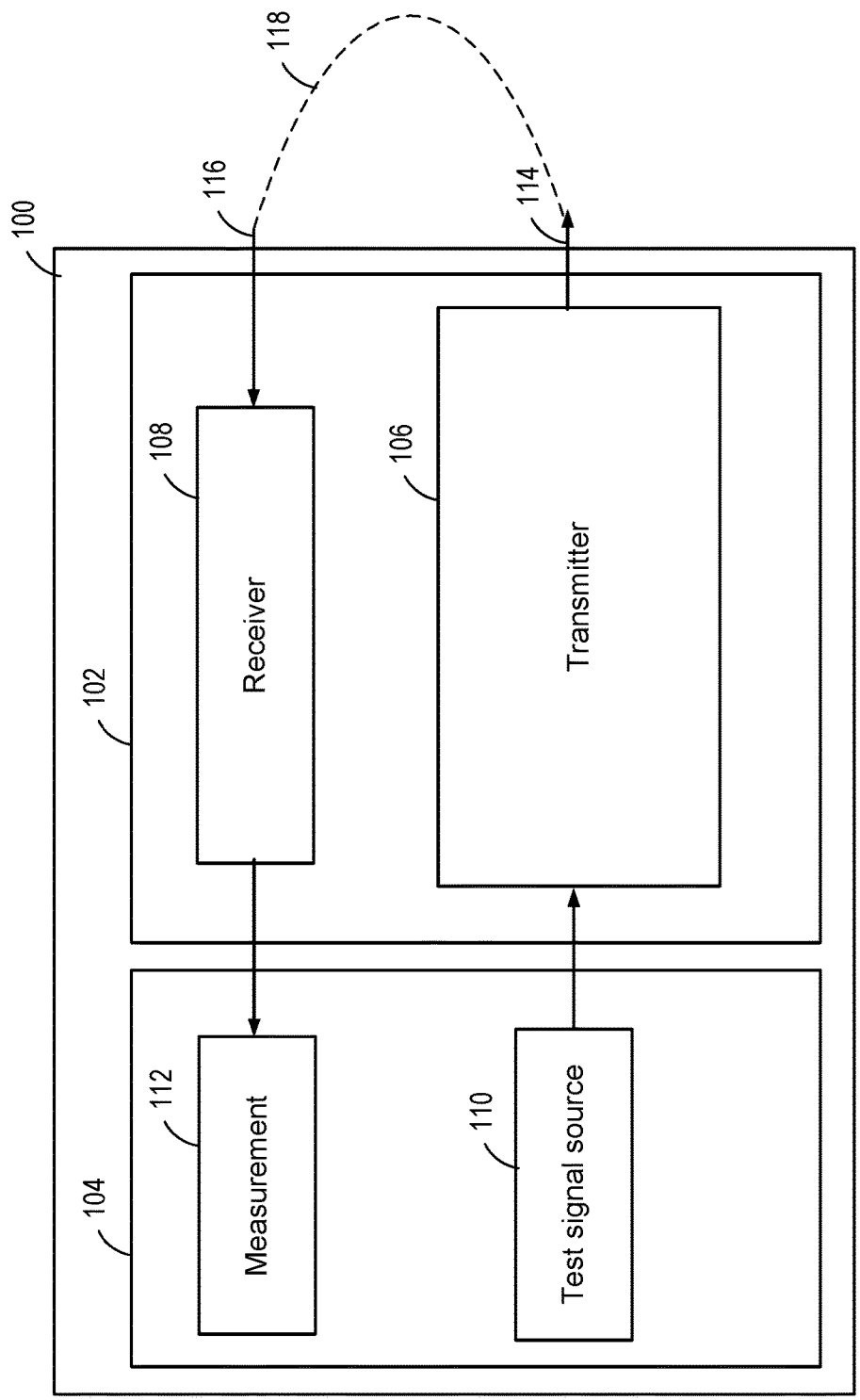
FIG. 1A shows an example of an IC with BIST circuits.

FIG. 1A shows an example of an IC 100 that includes a transceiver 102 and BIST circuits 104. Transceiver 102 includes a transmitter 106 and a receiver 108 (e.g. measurement receiver, MRX). BIST circuits 104 include a test signal source 110 and a measurement circuit 112. In a test mode, a transmitter output 114 of transmitter 106 is coupled to input 116 of receiver 108, as indicated by dashed line 118. The coupling indicated by dashed line 118 may be indirect, i.e. coupling may be through one or more additional components. Coupling may include different components at different times to test effects of different components.

In an example of a self-test operation, BIST circuits 104 may test transceiver 102 by generating a test signal in test signal source 110, which is provided to transmitter 106 of transceiver 102. Transmitter 106 generates an output signal accordingly, which is coupled from transmitter output 114, through one or more additional components in some cases, to input 116 of receiver 108 of transceiver 102. Receiver 108 then generates an output accordingly and provides its output to measurement circuit 112. Measurement circuit 112 then analyzes the signal from receiver 108 of transceiver 102 to generate one or more test metrics. For example, measurement circuit 112 may measure power in a main channel and in an adjacent channel of a signal from receiver 108 and may calculate the ratio of power in the adjacent channel to the power in the main channel to obtain the ACPR.

Figure 1B:
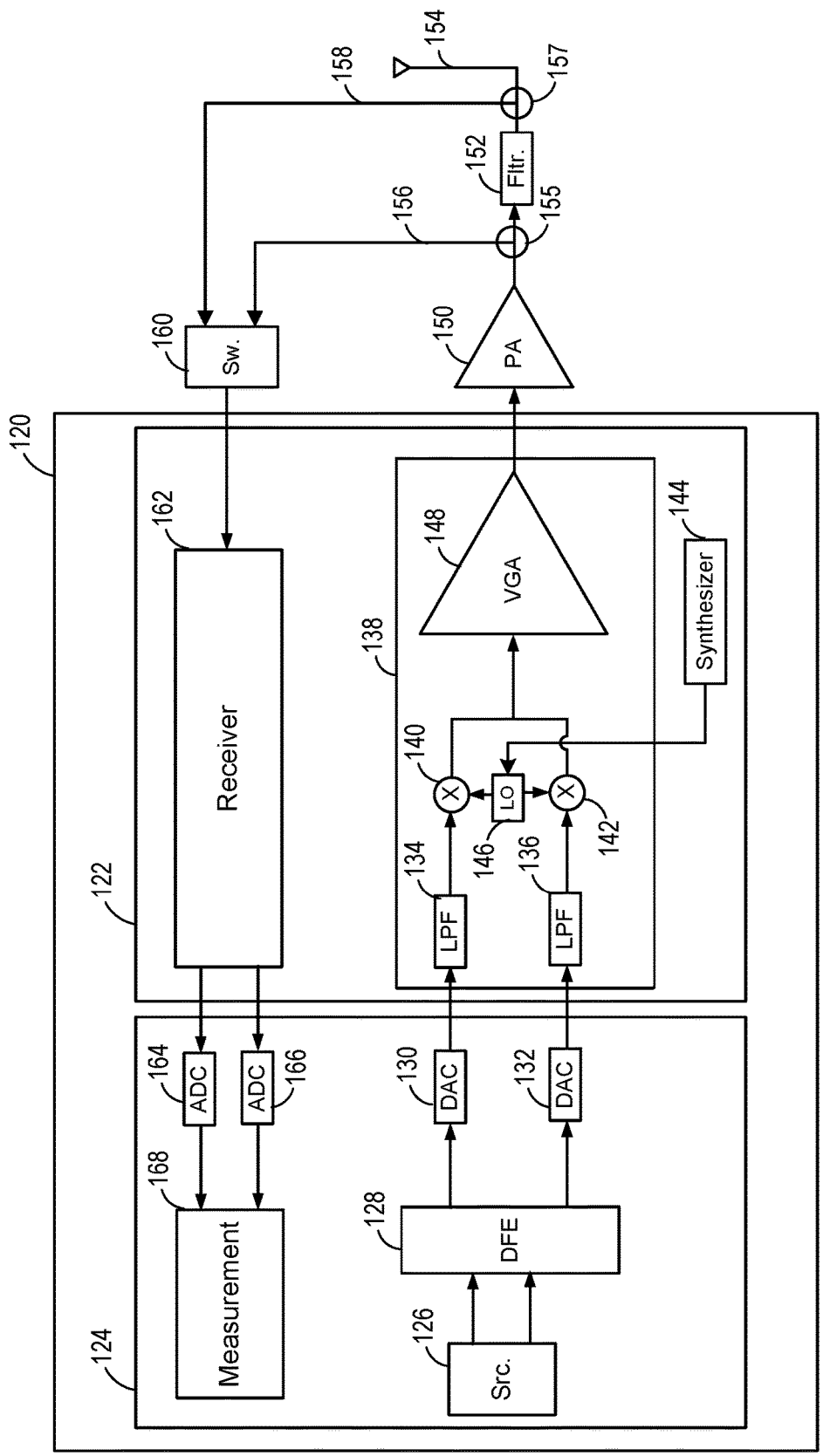
FIG. 1B shows a detailed example of an IC with BIST circuits.

FIG. 1B shows a more detailed illustration of an example implementation of an IC 120, which includes a transceiver 122 and BIST circuits 124. BIST circuits 124 include a modulated source 126 providing output to a digital front end 128, which provides digital outputs to digital-to-analog converters DACs 130, 132. For example, modulated source 126 may be configured to generate a range of test signals to simulate different signals that a transceiver may handle when in use. Digital front end 128 (DFE) may perform impairment corrections, including image correction, DC offset correction, and/or automatic power control (APC) and provides corresponding digital outputs in the form of in-phase and quadrature components (I and Q components respectively) to DACs 130 and 132 respectively. DACs 130, 132 convert these digital inputs to corresponding analog outputs, which are sent to Low Pass Filters, LPFs 134, 136 in transmitter 138 in transceiver 122. LPFs 134, 136 filter the analog signals they receive and pass the filtered signals to mixers 140, 142 respectively. A frequency synthesizer 144 in transceiver 122 generates a carrier signal at a predetermined frequency and provides it to Local Oscillator (LO) generation block 146, which provides quadrature LO signals to mixers 140, 142, which mix respective signals and provide them to a Variable Gain Amplifier, VGA 148. VGA 148 generates an output, the output of transmitter 138, to a Power Amplifier, PA 150, which is external to transceiver 122 in this example. PA 150 amplifies the signal and provides the amplified signal to a filter 152, which filters the signal and provides the filtered signal to antenna 154.

When transceiver 122 is in operation, e.g. in a cell phone or other wirelessly connected device, data such as voice data, video data, text, or other data may be transmitted by transmitter 138 via antenna 154 in response to a corresponding input to transmitter 138, e.g. an input from a microphone, camera, touchscreen, or other device. By applying test signals from modulated source 126 as an input to transmitter 138, transmitter 138 and other components may be tested. For example, output signals may be sampled at different locations to include or exclude effects of different components on test signals. Such signals may be fed back to transceiver 122 so that the receiver side of transceiver 122 may be included in testing. FIG. 1B shows signal 156 from coupler 155, which is coupled to the output of PA 150 and signal 158 from coupler 157, which is coupled to the output of filter 152 (input of antenna 154) provided to switch 160 (Sw.), which selects one of signal 156 or signal 158 to provide as input to receiver 162 (e.g. measurement receiver) of transceiver 122. It will be understood that, in normal operation, the output of transmitter 138 of transceiver 122 may not be coupled back to the input of receiver 162 and that this arrangement is generally for test purposes. Receiver 162 generates in-phase and quadrature component signals corresponding to the signal received through switch 160 and provides these signals to Analog-to-Digital Converters, ADCs 164, 166 of BIST circuits 124, which convert the in-phase and quadrature component signals to corresponding analog signals, which are sent to an ACPR measurement circuit 168.

Figure 2:
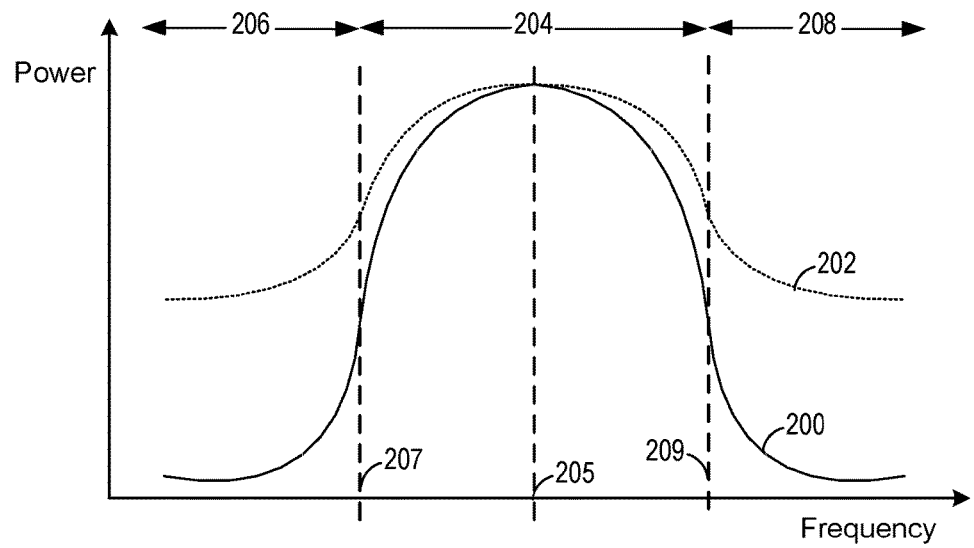
FIG. 2 illustrates examples of signals with different ACPR values.

FIG. 2 illustrates an example of how an ACPR measurement circuit such as ACPR measurement circuit 168 of FIG. 1B may measure ACPR to obtain an ACPR value. FIG. 2 shows the power distribution of signal 200 and signal 202 over a frequency range that includes a main channel 204 centered around a central frequency 205, with power shown on the vertical axis and frequency on the horizontal axis. A lower adjacent channel 206 extends below the lower frequency limit 207 of main channel 204 and an upper adjacent channel 208 extends above the upper frequency limit 209 of main channel 204. It can be seen that signal 202 has higher power than signal 200 in adjacent channels 206, 208 on either side of main channel 204. In general, it is desirable to have little spectral spreading so that power is focused in a main channel (useful signal) and have little or no power in adjacent channels (intermodulation signal). Thus, signal 200 would generally be considered more desirable than signal 202. ACPR provides a metric for spectral spread and may be defined as the ratio of power in an adjacent channel to power in the main channel, e.g. ratio of power in adjacent channels 206, 208 to power in main channel 204. One way to obtain an ACPR value is to measure power in a main channel and power in adjacent channels and then calculate the ratio. Thus, for a given signal provided by modulated source 126, ACPR measurement circuit 168 may measure main channel power (e.g. power in main channel 204), measure adjacent channel power (e.g. power in adjacent channels 206, 208) and may calculate a ratio accordingly. For a transceiver that is expected to operate with a variety of different signals, each signal may be separately tested. Modulated source 126 may provide different modulated signals such as 3G (UMTS) 4G, and LTE, using a variety of different modulation schemes (QPSK, QAM), over a range of different frequencies while ACPR measurement circuit makes corresponding power measurements and calculates ACPR values. Such testing may take significant time and resources.

According to an aspect of the present technology, ACPR estimation may be performed by BIST circuits in a flexible manner that does not require extensive testing with a range of different test signals and thus may simplify testing and may allow rapid testing that is valid for a range of different signals. ACPR estimation may include providing a simple test signal, such as a two-tone signal, as an input to a transmitter of a transceiver where the transmitter output is looped back to the receiver input and the transceiver output (receiver output) is provided to an ACPR estimator. The test signal is also directly provided to the ACPR estimator which calculates coefficients of a polynomial that represents the transceiver output signal. This signal may then be analyzed to obtain a main channel power and adjacent channel power. For example, a modulated signal statistics with frequency filtering corresponding to a main channel may be represented by weight factors (weighting factors), which can be applied to polynomial coefficients to obtain main channel power. A modulated signal statistics with frequency filtering corresponding to an adjacent channel may be represented by other weight factors, which can be applied to polynomial coefficients to obtain adjacent channel power. Thus, from the polynomial coefficients, ACPR may be calculated without directly measuring power in different frequency ranges over a range of different signals, i.e. without directly measuring either main channel power or adjacent channel power. Polynomial coefficients may be generalized representations that can be used to model a wide range of signals using different weight factors.

Figure 3:
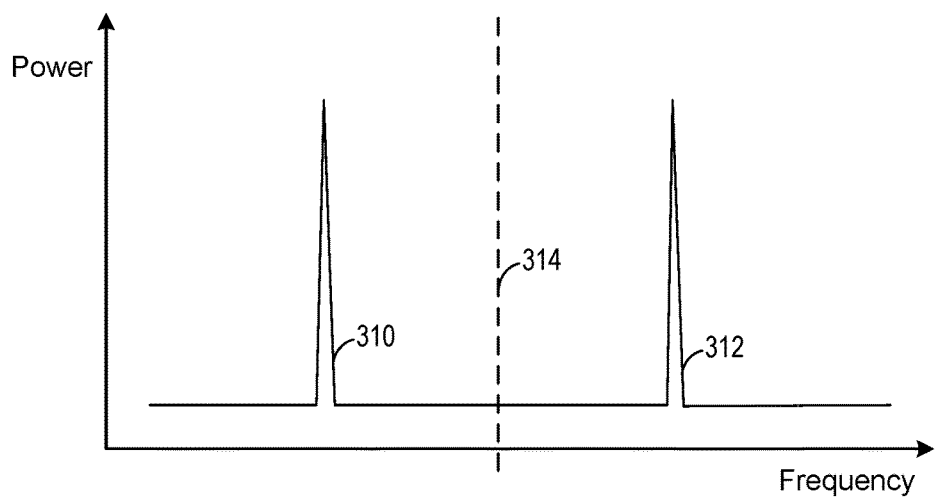
FIG. 3 illustrates an example of a two-tone signal.

FIG. 3 shows an example of a two-tone signal that includes a first tone 310 (a first spike in amplitude or power)

at a first frequency and a second tone (a second spike in amplitude or power) at a second frequency. First tone 310 and second tone 312 are equidistant from a central frequency 314. Central frequency 314 may be chosen as a frequency of interest for testing and may be the central frequency for an ACPR measurement (e.g. may correspond to central frequency 205 of FIG. 2). First tone 310 may be at a first frequency corresponding to lower frequency limit 207 and second tone 312 may be at a second frequency corresponding to upper frequency limit 209. For example, for a signal with a nominal frequency of 1 GHz, a main channel may extend from 995 MHz to 1005 MHz and a two-tone signal may have tones at 995 MHz and 1005 MHz accordingly. While tone frequencies may correspond to the main channel as shown, other tone frequencies may be selected as desired, for example, using more than two tones, at a frequency or frequencies that are different to those shown.

FIG. 4A provides an illustration of how a two-tone signal, such as illustrated in FIG. 3, may be used by BIST circuits to estimate an ACPR value. FIG. 4A shows an shows an example of an IC 400 that includes a transceiver 402 and BIST circuits 404 coupled to transceiver 402 to estimate an ACPR value of transceiver 402. Transceiver 402 includes a transmitter 406 and a receiver 408 (e.g. measurement receiver). BIST circuits 404 include a signal source 410 and an ACPR estimator 412. In a test mode, a transmitter output 414 of transmitter 406 is coupled to a receiver input 416 of receiver 408, as indicated by dashed line 418. The coupling indicated by dashed line 418 may be indirect, i.e. coupling may be through one or more additional components. Coupling may include different components at different times to test effects of different components.

In an example of a self-test operation, BIST circuits 404 may test transceiver 402 by generating a source signal, such as a two-tone source signal as illustrated in FIG. 3, in signal source 410, which is provided to transmitter 406 of transceiver 402. Transmitter 406 generates an output signal accordingly, which is coupled from transmitter output 414, through one or more additional components in some cases, to input 416 of receiver 408 of transceiver 402. Receiver 408 then generates an output accordingly and provides its output to ACPR estimator 412. ACPR estimator 412 then analyzes an evaluation signal from receiver 408 of transceiver 402 and a source signal from signal source 410 to estimate an ACPR value. For example, ACPR estimator 412 may include circuits configured to generate polynomial coefficients for a polynomial expression that represents the estimation signal (i.e. a polynomial representation of an output signal of transceiver 402) and to apply weight factors to such coefficients to obtain values for main channel power and adjacent channel power from which an ACPR value is calculated.

Figure 4B:
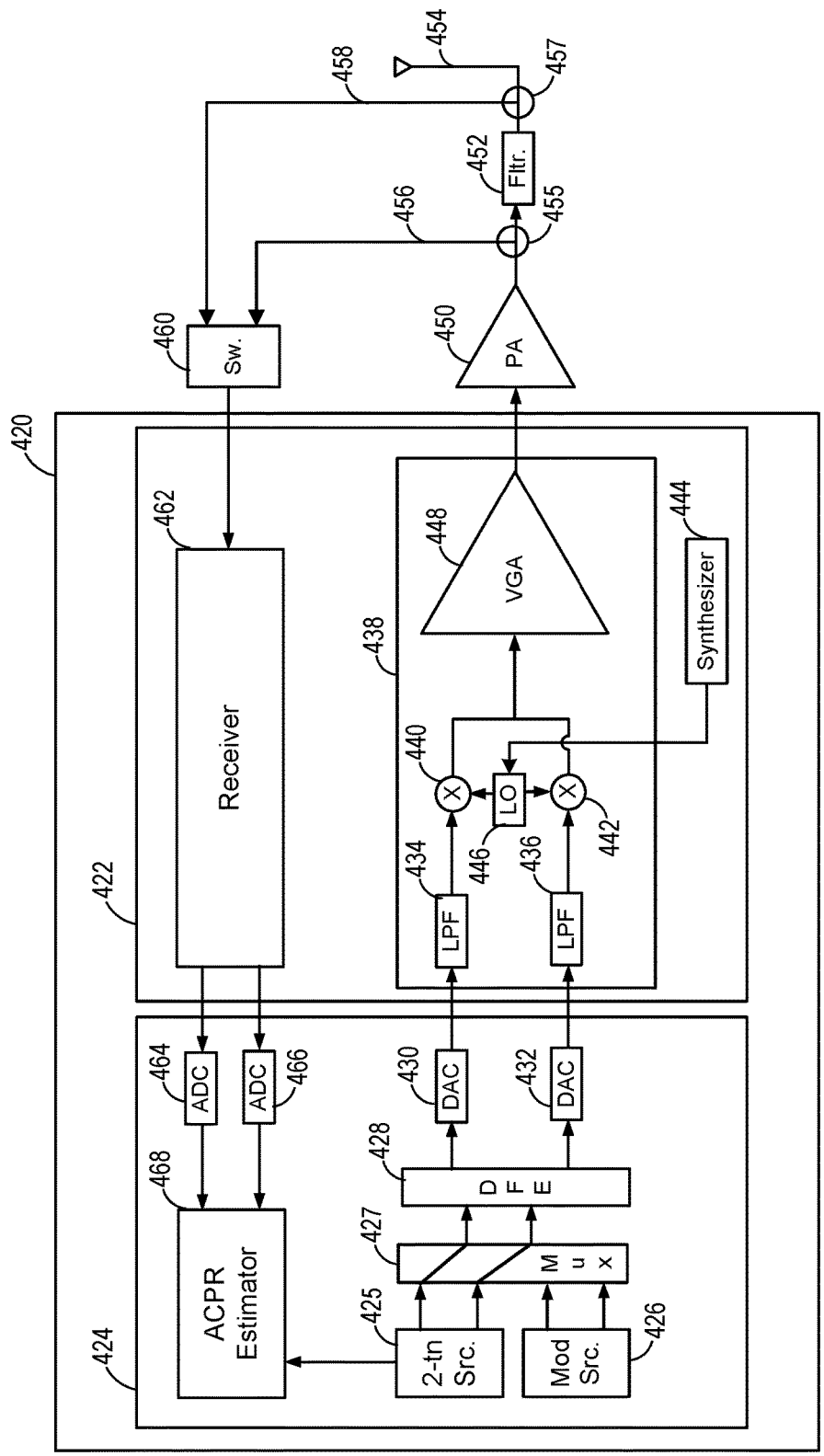
FIG. 4B shows a detailed example including BIST circuits with ACPR estimation.

FIG. 4B shows a more detailed illustration of an example implementation of an IC 420, or die, which includes a transceiver 422 and BIST circuits 424. Transceiver 422, BIST circuits 424, and in some cases additional circuits, may be formed on a common die, which may be referred to as a "transceiver die" or IC (e.g. IC 420) with transceiver 422 formed in an analog portion and BIST circuits 424 formed in a digital portion. BIST circuits 424 include a two-tone source 425 configured to generate a two-tone source signal, e.g. like the example illustrated in FIG. 3. Two-tone source 425 may be considered a signal generator, i.e. two-tone source signal generator. BIST circuits 424 also include a modulated source 426, which may represent the modulated signal for real operation (i.e. for operations other than testing operations), for example 3G (UMTS) 4G, and LTE, using a variety of different modulation schemes (QPSK, QAM), over a range of different frequencies. Outputs from two-tone source 425 (2-tn Src.) and modulated source 426 (Mod Src.) are connected to multiplexer 427, which selects an input from either two-tone source 425 or modulated source 426 to a digital front end 428. Digital front end 428 provides digital outputs to digital-to-analog converters DACs 430, 432. Digital front end 428 may perform various impairment corrections, including for example image correction, DC offset correction, and/or automatic power control (APC), and provides corresponding digital outputs in the form of in-phase and quadrature components (I and Q components respectively) to DACs 430 and 432 respectively. DACs 430, 432 convert these digital inputs to corresponding analog outputs, which are sent to Low Pass Filters, LPFs 434, 436 in transmitter 438 in transceiver 422. LPFs 434, 436 filter the analog signals they receive and pass the filtered signals to mixers 440, 442 respectively. A frequency synthesizer 444 in transceiver 422 generates a carrier signal at a predetermined frequency and provides it to LO generation block 446, which provides quadrature LO signal components (at 90 degrees with respect to each other) to mixers 440, 442, which mix respective signals and provide them to a Variable Gain Amplifier, VGA 448. VGA 448 generates an output, the output of transmitter 438, to a Power Amplifier, PA 450, which is external to transmitter 438 and to transceiver 422 in this example. PA 450 amplifies the signal and provides the amplified signal to a filter 452, which filters the signal and provides the filtered signal to antenna 454.

When transceiver 422 is in operation, e.g. in a cell phone or other wirelessly connected device, data such as voice data, video data, text, or other data may be transmitted by transmitter 438 via antenna 454 in response to a corresponding input to transmitter 438, e.g. an input from a microphone, camera, touchscreen, or other device. By applying test signals, such as a modulated signal from modulated source 426, or a two-tone signal from two-tone source 425 as an input to transmitter 438, transmitter 438 and other components may be tested. For example, output signals of transmitter 438 may be sampled at different locations to include or exclude effects of different components on test signals. Such signals may be fed back to transceiver 422 so that the receiver side of transceiver 422 may be included in testing. Components that are external to IC 420 may be formed on a Printed Circuit Board (PCB), for example, and antenna 454 may be replaced with a resistor (e.g. 50 ohm termination) for testing purposes. In some cases, a transmitter output and a receiver input may be coupled internally in a transceiver circuit, e.g. output of transmitter 438 may be coupled to input of receiver 462 within transceiver 422 where only transceiver 422 is to be tested (and not PA 450 or filter 452).

FIG. 4B shows signal 456 from coupler 455, which is coupled to the output of PA 450 and signal 458 from coupler 457, which is coupled to the output of filter 452 (input of antenna 454) provided to switch 460, which selects one of signal 456 or signal 458 to provide as input to receiver 462 of transceiver 422. Switch 460 is configured to switchably couple a transmitter output signal from transmitter 438 and one or more additional components to the input of receiver 462. Receiver 462 generates in-phase and quadrature component signals corresponding to the signal received through switch 460 and provides these signals to Analog-to-Digital Converters, ADCs 464, 466 of BIST circuits 424, which convert the in-phase and quadrature component signals to corresponding analog signals, which are sent to ACPR estimator 468.

Unlike ACPR measurement circuit such as ACPR measurement circuit 168, which directly measure main channel power and adjacent channel power, ACPR estimator 468 is configured to receive both an evaluation signal from transceiver 422 (via ADCs 464, 466) and a two-tone signal from two-tone source 425 (i.e. directly supplied from two-tone source 425 so that the source signal is the same as provided to transceiver 422 and is not substantially affected by intermediate components and may be considered a clean signal). While an evaluation signal from transceiver 422 is shown as provided as two inputs via ADCs 464 and 466, it will be understood that these represent in-phase and quadrature components of what may be considered a common signal. ACPR estimator 468 can evaluate an evaluation signal to identify changes in the signal along its pathway through transceiver 422, i.e. identify changes between the clean source signal and the resulting evaluation signal at the end of a loop through transmitter 438 and receiver 462 (and/or other components). Changes may be represented in the form of a polynomial that expresses an evaluation signal as a function of a source signal and such a polynomial expression may be used to estimate an ACPR value. For example, coefficients of such a polynomial may be estimated based on a source signal (e.g. two-tone source signal) and an evaluation signal and weight factors may be applied to estimate main channel power and adjacent channel power.

Figure 5:
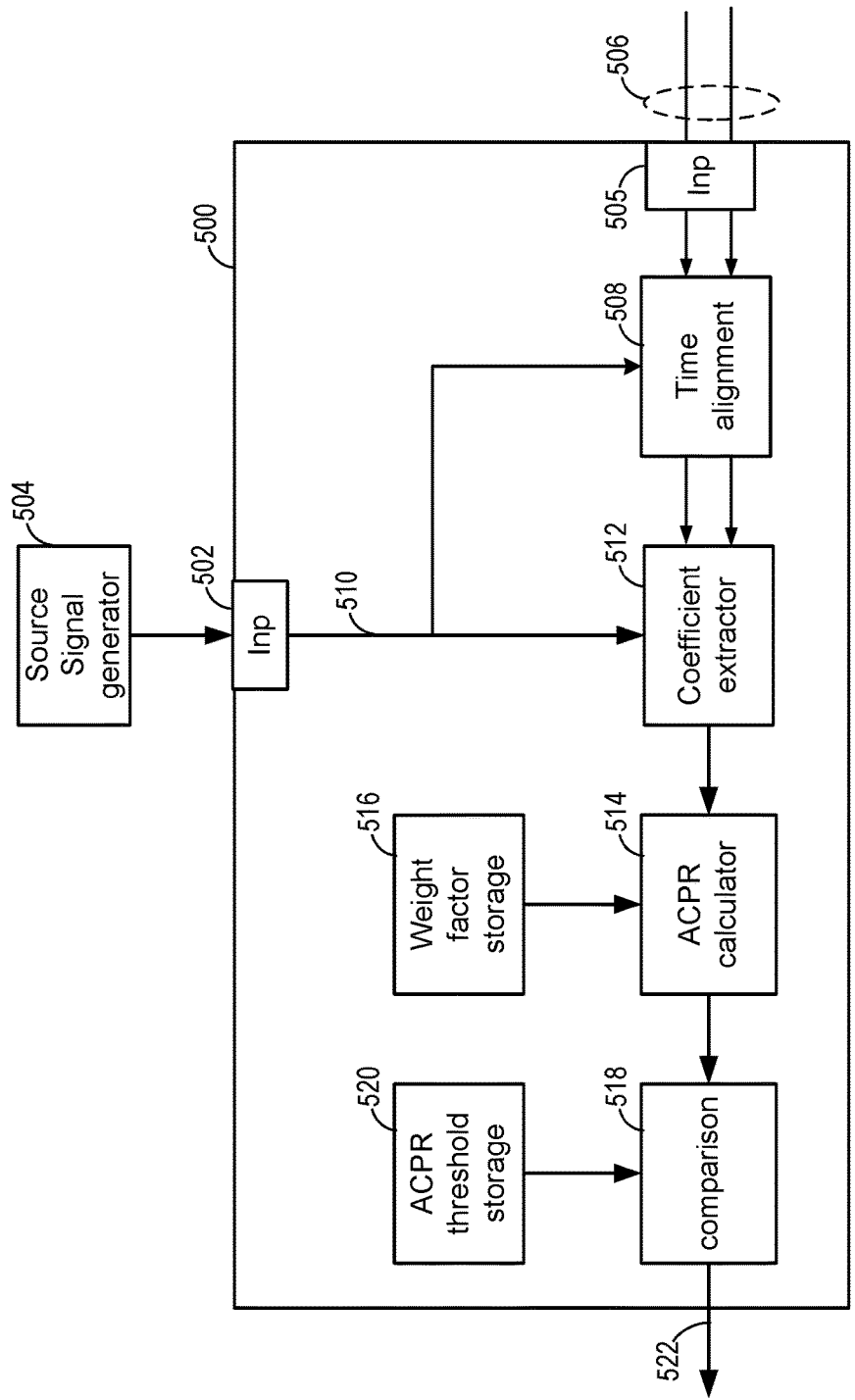
FIG. 5 shows an example of an ACPR estimator.

FIG. 5 illustrates an example of an ACPR estimator 500 that may be used in BIST circuits, e.g. used as ACPR estimator 468 in BIST circuits 424 of FIG. 4B to estimate an ACPR value from an evaluation signal and a source signal. ACPR estimator 500 includes a source signal input 502 (Inp) configured to receive a source signal from a source signal generator. Source signal generator 504 may be a two-tone source and may generate a two-tone source signal, e.g. as shown in FIG. 3. ACPR estimator 500 also includes an evaluation signal input 505 (Inp), which is configured to receive an evaluation signal 506, which in this case includes in-phase and quadrature components, e.g. in-phase component from ADC 464 and quadrature component from ADC 466 of FIG. 4B. Evaluation signal input 505 is coupled to a time alignment circuit 508 which is also coupled to source signal input 502 to receive source signal 510 generated by source signal generator 504. Time alignment circuit 508 is configured to provide time alignment between the source signal 510 from the source signal input 502 and evaluation signal 506 from the evaluation signal input 505 and to provide time-adjusted signals to a coefficient extractor 512. For example, time alignment circuit 508 may apply a delay to evaluation signal 506 to align it with source signal 510 so that evaluation signal 506 and source signal 510 are time-aligned at coefficient extractor 512.

Coefficient extractor 512 is configured to extract coefficients of a polynomial representing evaluation signal 506 from evaluation signal 506 and source signal 510. For example, coefficient extractor 512 may use regression, such as a least mean square (LMS) approach, to generate coefficients of a polynomial that fits evaluation signal 506. It will be understood that the polynomial used, and the estimation technique may be chosen according to requirements. For example, a more complex polynomial may give higher accuracy but may require greater resources. Aspects of the present technology are applicable to a range of polynomials and estimation techniques and are not limited to any examples presented here.

Coefficients calculated by coefficient extractor 512 are sent to an Adjacent Channel Power Ratio (ACPR) calculator 514, which is also coupled to a weight factor storage 516 containing a plurality of weight factors. Weight factor storage 516 may be a memory, or portion of a memory, that stores weight factors in a table or other format. Weight factors may be generated off-line and may be loaded in BIST circuits as a portion of firmware or in another configurable format. Weight factors in weight factor storage 516 may correspond to a modulated signal with frequency filtering. For example, weight factors in weight factor storage 516 may include a first set of weight factors corresponding to a main channel (e.g. main channel 204 in FIG. 2) so that applying such weight factors filters out signal components outside of the main channel. Weight factors in weight factor storage 516 may include a second set of weight factors corresponding to an adjacent channel (e.g. adjacent channel 206 of FIG. 2) so that applying such weight factors filters out signal components outside of such an adjacent channel, including signal components of a main channel.

ACPR calculator 514 is configured to calculate an ACPR value from the evaluation signal 506 and the source signal 510 by applying the stored weight factors from weight factor storage 516 to coefficients from coefficient extractor 512. For example, ACPR calculator 514 may be configured to calculate an ACPR value by applying the first set of weight factors (corresponding to the main channel) to the coefficients to obtain main channel power, apply the second set of weight factors (corresponding to the adjacent channel) to the plurality of coefficients to obtain adjacent channel power, and to calculate the ACPR value from a ratio of the adjacent channel power to the main channel power. Examples of such calculations are described below.

A transceiver such as transceiver 422 may be operated according to an ACPR value calculated by an ACPR calculator such as ACPR calculator 514 in various ways. An example of using an ACPR value calculated by an ACPR calculator is categorizing a transceiver according to a corresponding ACPR value. ACPR calculator 514 is coupled to a comparison circuit 518, which is configured to compare an ACPR value from ACPR calculator 514 with an ACPR threshold. ACPR threshold storage 520 is connected to comparison circuit 518 and is configured to hold one or more ACPR thresholds that may be compared with an ACPR value (or values) from ACPR calculator 514 by comparison circuit 518. Operating a transceiver according to the ACPR value may include comparing an ACPR value from an ACPR calculator with a threshold and categorizing the transceiver accordingly into a category from a plurality of categories that includes at least: pass and fail. In some cases, different ACPR values may be calculated, e.g. at different frequencies, and each such ACPR value may be separately compared with different ACPR thresholds, or the same ACPR threshold. In some cases, a combined ACPR value may be obtained and compared with an ACPR threshold. An ACPR value below a pass/fail threshold may result in discarding an IC, i.e. a transceiver may be categorized, or binned, into a fail category according to its ACPR value above the threshold and in response the transceiver may be discarded. Where an a transceiver is categorized into a pass category according to its ACPR value (ACPR value below the threshold) the transceiver may be incorporated in an assembly such as a PCB for inclusion in a customer product. Comparison circuit 518 provides an output signal 522 that may be sent to external components where it may be used in operating the transceiver or for various purposes. While comparison circuit 518 and ACPR threshold storage 520 are shown as components of ACPR estimator 500 in FIG. 5, these components may be external to an ACPR estimator in some arrangements, and an ACPR value may be directly provided to one or more external components by an ACPR estimator instead of, or in addition to, using such results within an ACPR estimator. External components receiving an ACPR value from an ACPR estimator may then use the ACPR value in operating the transceiver, or for other purposes.

Figure 6:
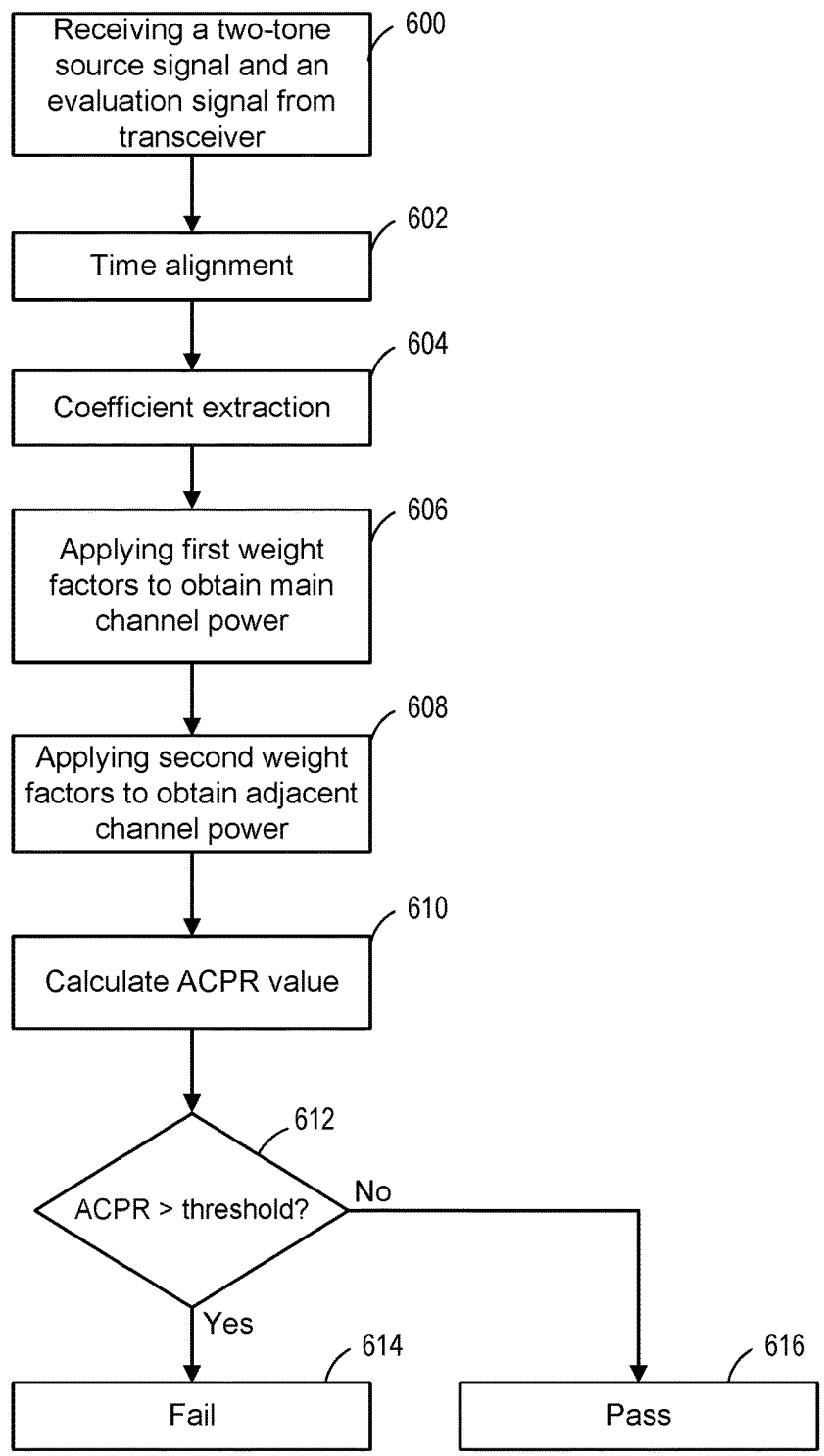
FIG. 6 illustrates an example of a method of obtaining an ACPR value and operating an IC according to the ACPR value.

Operation of ACPR estimator, such as ACPR estimator 500 is illustrated in FIG. 6, which includes receiving a two-tone source signal and an evaluation signal from a transceiver 600, e.g. receiving source signal 510 in source signal input 502 and evaluation signal 506 in evaluation signal input 505. Time alignment 602 aligns the source signal and the evaluation signal so that time-aligned signals are received by a coefficient extractor, e.g. time alignment by time alignment circuit 508 prior to sending signals to coefficient extractor 512. Coefficient extraction 604 generates coefficients of a polynomial that represents the evaluation, e.g. coefficient extraction by coefficient extractor 512. The process includes applying first weight factors to obtain main channel power 606 and applying second weight factors to obtain adjacent channel power 608, e.g. ACPR calculator 514 applying first and second weight factors from weight factor storage 516. The main channel power and adjacent channel power may then be used to calculate an ACPR value 610, e.g. in ACPR calculator 514. The ACPR value may then be compared with one or more thresholds to determine if the ACPR value is greater than a threshold 612, e.g. comparison of ACPR value by ACPR comparison circuit 518. FIG. 6 shows example of comparison with a pass/fail threshold where, if the ACPR value is greater than the threshold, then it is considered a fail 614 and if the ACPR value is less than the threshold, then it is considered a pass 616. In addition to pass and fail categories, an IC may be further categorized according to its ACPR, for example, transceiver ICs with different ACPR values may be suitable for different applications and may be binned accordingly and incorporated in different products according to their ACPR values. Furthermore, transceiver ICs with different ACPR values may be operated differently, for example, by operating at different frequencies, power levels, with different filtering, different levels of error correction, or otherwise.

Specific examples of ACPR calculation will now be described. However, it will be understood that the examples are not limiting and that an ACPR value may be obtained using different techniques than those in the examples below. For examples, different polynomials may be used to describe an evaluation signal and/or different terms of a polynomial may be used or discarded. Different filtering may be applied using different weight factors or modeling filters in other ways.

In a memory-less system that includes a transmitter (e.g. transceiver 422 of FIG. 4B) an output signal including distortion related to ACPR can be written in the following polynomial form:

$$\text{Out} = A(1)*\text{in} + A(2)*|\text{in}|^2*\text{in} + A(3)*|\text{in}|^4*\text{in} + \quad \text{Eq. 1}$$
$$A(4)*|\text{in}|^6*\text{in} + A(5)*\text{in}^{*3} + A(6)*\text{in}^5 + A(7)*|\text{in}|*\text{in} +$$
$$A(8)*|\text{in}|^3*\text{in} + A(9)*|\text{in}|^5*\text{in} + A(10)*\frac{\text{in}^3}{|\text{in}|^2} + \ldots$$

Where in Equation 1, "Eq. 1", "Out" is the output signal of a transceiver (e.g. output signal received from a transceiver such as transceiver 422) or TX path and "in" is the input signal to the transceiver (e.g. source signal generated by two-tone source 425 provided to transceiver 422) and where each coefficient (A) in Eq. 1 represents the following:

A(1): linear gain
A(2): $3^{rd}$ order non-linearity
A(3): $5^{th}$ order non-linearity
A(4): $7^{th}$ order non-linearity
A(5): CIM3 non-linearity
A(6): CIM5 non-linearity
A(7): $2^{nd}$ order non-linearity (e.g. from PA self-bias effect)
A(8): $4^{th}$ order non-linearity (e.g. from PA self-bias effect)
A(9): $6^{th}$ order non-linearity (e.g. from PA self-bias effect)
A(10): $2^{nd}$ harmonics pulling effect It will be understood that these coefficients are just an example. Depending on the system, more terms can be added to improve the accuracy, and/or some terms can be removed to reduce the calculation complexity.

After time alignment (such as time alignment provided by time alignment circuit 508) using a least mean square (LMS) method or otherwise, all the coefficients can be extracted (e.g. by coefficient extractor 512). Coefficients A(1) to A(10) are complex numbers with phases representing the relative phases of distortion terms when adding them together. In general, for memory-less non-linearity to be valid, an LPF inside the transceiver, such as LPF 434 and LPF 436 may be set wide open relative to the frequency of the two-tone source frequency. A two-tone source signal that is modelled using LMS fit is generally more immune to estimation variation under poor signal to noise ratio (SNR) compared to traditional methods. In some cases, poor SNR may be un-avoidable during factory testing so that use of a two-tone source signal may provide a significant advantage over traditional methods in such a scenario.

Based on polynomial coefficients A(1) to A(10) of Eq. 1, an ACPR value can be estimated by estimating main channel power (i.e. power of a desired transmitter output signal), adjacent channel power (i.e. the power in the ACPR region) from the polynomial coefficients and calculating the ratio between these two powers.

Eq. 1 may be rewritten in generic form as:

$$\text{out}(t) = \sum_{n=1}^{N} (A(n)*f_n(\text{in})) \quad \text{Eq. 2}$$

Where $f_n(\text{in})$ is $n^{th}$ distortion term based on the input signal in and N is the total number of distortion terms included for the analysis. So the main channel power (desired transmitter (tx) power) is:

$$\text{filter}_{tx}(\text{out}) = \text{filter}_{tx}\left(\sum_{n=1}^{N}(A(n)*f_n(\text{in}))\right) = \sum_{n=1}^{N} A(n)*\text{filter}_{tx}(f_n(\text{in})) \quad \text{Eq. 3}$$

Where $\text{filter}_{tx}$ is the filtering function that passes the main channel signal and filters out signals outside of the main channel frequency range (e.g. passing frequencies of main channel 204 and filtering out frequencies of adjacent channels 206, 208 of FIG. 2). When appropriate, this $\text{filter}_{tx}$ can follow a definition set by a standard such as the 3GPP definition, e.g. root raise cosine (RRC) filter for wideband code division multiple access (WCDMA) related power estimation.

Defining $Xtx_n = \text{filter}_{tx}(f_n(\text{in}))$, Eq. 3 can be written as:

$$\text{out}_{tx} = \text{filter}_{tx}(\text{out}) = \sum_{n=1}^{N}(A(n) * Xtx_n) \quad \text{Eq. 4}$$

The expected power of the main channel is given by: $\text{out}_{tx}*\text{out}_{tx}^*$, i.e. $\text{out}_{tx}$ multiplied by its conjugate, which in matrix form may be written as:

$$\text{out}_{tx} * \text{out}_{tx}^* = \sum_{n=1}^{N}(A(n)*Xtx_n) * \sum_{n=1}^{N}(A(n)^* * Xtx_n^H) \quad \text{Eq. 5}$$

Where $Xtx_n^H$ is the conjugate transpose of $Xtx_n$. Eq. 5 may be rewritten as:

$$\text{out}_{tx} * \text{out}_{tx}^* = \sum_{n1=1}^{N}\sum_{n2=1}^{N}(A(n1)*A(n2)^* * Xtx_{n1} * Xtx_{n2}^H) \quad \text{Eq. 6}$$

Since terms: $Xtx_{n1}*Xtx_{n2}^H$ are pre-defined from the distortion terms included in the analysis, they may be a known value for a given modulation signal, which means they may be treated as weight factors and may be calculated and stored in a memory so that they can be rapidly accessed and applied for fast testing. For example, such filter terms may be calculated offline from models of one or more ideal waveforms and analysis of statistics associated with transmission and filtering of such waveforms. Weight factors for different filters may be loaded into a weight factor storage for subsequent use, e.g. loaded as part of firmware, or otherwise. With N total distortion terms, weight factors may be in the form of an N×N matrix. Eq. 6 applies such terms to polynomial coefficients found from coefficient extraction to obtain main channel power.

To calculate adjacent channel power (e.g. power of adjacent channel 206 of FIG. 2), the process is similar to the process above for calculating main channel power with the change of the filtering function to pass the signal within an adjacent channel frequency range and reject signal components outside the adjacent channel frequency range. The polynomial coefficients remain the same as in Eq. 6. This provides the following equation, which is similar to corresponding equation 6 above for main channel power:

$$\text{out}_{acp} * \text{out}_{acp}^* = \sum_{n1=1}^{N}\sum_{n2=1}^{N}(A(n1)*A(n2)^* * Xacp_{n1} * Xacp_{n2}^H) \quad \text{Eq. 7}$$

Since terms: $Xacp_{n1}*Xacp_{n2}^H$ are known for a given modulation signal (similarly to $Xtx_{n1}*Xtx_{n2}^H$) they may be treated as weight factors and may be calculated and stored in a memory so that they can be rapidly accessed and applied for fast testing. With N total distortion terms, weight factors may be in the form of an N×N matrix.

Finally, an ACPR value can be calculated from the following using main channel power from Eq. 6 and adjacent channel power from Eq. 7:

$$ACPR = \frac{\text{out}_{acp} * \text{out}_{acp}^*}{\text{out}_{tx} * \text{out}_{tx}^*} \quad \text{Eq. 8}$$

The pre-calculated weight factor matrix approach allows the test system to capture an arbitrarily long sequence (which may be limited by offline computer capability) of a modulated signal so that the effective measurement fluctuation is reduced. In contrast, a long, modulated test signal sequence is not generally possible for the traditional direct modulated signal measurement approach due to test time limitation where a large number of different modulated signals are measured.

The results below show an example of weight factors in the form of N×N matrices for the main channel (e.g. main channel 204) lower adjacent channel (e.g. adjacent channel 206) and upper adjacent channel (e.g. adjacent channel 208). These are based on a two-tone 10 MHz signal (in this example a full Resource Block (RB) Long Term Evolution (LTE) signal according to the Evolved Universal Terrestrial Radio Access (EUTRA) protocol). The following examples are based on a limited number of distortion terms, in this case the following five distortion terms corresponding to the first five coefficients of Eq. 1:

A(1): linear gain
A(2): 3rd order non-linearity (IM3)
A(3): 5th order non-linearity (IM5)
A(4): 7th order non-linearity (IM7)
A(5): CIM3 non-linearity The main channel weight factor matrix (desired TX weight factor matrix, i.e. matrix of terms $Xtx_{n1}*Xtx_{n2}^H$) in this example is calculated (e.g. offline calculation based on LTE10 MHz signal) as the following (where for simplicity individual weight factors are written without corresponding exponent term, which in this example is $10^6$, or 1.0e+06*):
0.0581+0.0000i 0.0765−0.0000i 0.1246−0.0000i 0.2472+0.0002i −0.0023−0.0018i 0.0765+0.0000i 0.1123+0.0000i 0.2058+0.0000i 0.4581+0.0003i −0.0040−0.0031i 0.1246+0.0000i 0.2058−0.0000i 0.4288+0.0000i 1.0742+0.0004i −0.0086−0.0071i 0.2472−0.0002i 0.4581−0.0003i 1.0742−0.0004i 2.9822+0.0000i −0.0200−0.0191i −0.0023+0.0018i −0.0040+0.0031i −0.0086+0.0071i −0.0200+0.0191i 0.0755+0.0000i The lower adjacent channel weight factor matrix (i.e. matrix of terms $Xacp_{n1}*Xacp_{n2}^H$) in this example is calculated (e.g. offline calculation based on LTE10 MHz signal) as the following (where for simplicity individual weight factors are written without corresponding exponent term, which in this example is $10^5$, or 1.0e+05*):
0.0000+0.0000i 0.0000−0.0000i 0.0000−0.0000i 0.0000−0.0000i −0.0000−0.0000i 0.0000+0.0000i 0.0479+0.0000i 0.1644+0.0003i 0.5148+0.0013i −0.0021−0.0023i 0.0000+0.0000i 0.1644−0.0003i 0.6352+0.0000i 2.1831+0.0016i −0.0069−0.0088i 0.0000+0.0000i 0.5148−0.0013i 2.1831−0.0016i 8.0895+0.0000i −0.0186−0.0294i −0.0000+0.0000i −0.0021+0.0023i −0.0069+0.0088i −0.0186+0.0294i 0.2057+0.0000i The upper adjacent channel weight factor matrix in this example is calculated (e.g. offline calculation based on LTE10 MHz signal) as the following 5×5 matrix (where for simplicity individual weight factors are written without corresponding exponent term, which in this example is $10^5$, or 1.0e+05*):
0.0000+0.0000i 0.0000−0.0000i 0.0000−0.0000i 0.0000−0.0000i −0.0000−0.0000i 0.0000+0.0000i 0.0479+0.0000i 0.1644+0.0003i 0.5148+0.0013i −0.0021−0.0023i 0.0000+

0.0000i 0.1644−0.0003i 0.6352+0.0000i 2.1831+0.0016i
−0.0069−0.0088i 0.0000+0.0000i 0.5148−0.0013i 2.1831−
0.0016i 8.0895+0.0000i −0.0186−0.0294i −0.0000+0.0000i
−0.0021+0.0023i    −0.0069+0.0088i    −0.0186+0.0294i
0.2057+0.0000i

The rows of the above matrixes correspond to signal and distortions and the columns correspond to the conjugate of signal and distortions. Combining extracted polynomial coefficients (e.g. from coefficient extractor 512) with the weight factor matrixes above (e.g. according to Eq. 6 and Eq. 7) provides values for main channel power and adjacent channel power for the upper adjacent channel and lower adjacent channel. The results of estimation using such matrices show a high level of accuracy when compared with results obtained from direct measurement, i.e. compared with directly measuring main channel power and adjacent channel power. An example of compared results is provided in the following example, in which lower adjacent channel power and upper adjacent channel power of an LTE 10 MHz EUTRA signal was estimated using weight factors applied to polynomial coefficients (left column) as described above and also directly measured (right column) for comparison.

| Case | Two-tone based estimation (Present technology) (dB) | Direct measured result from equipment (Ideal Case) (dB) |
|---|---|---|
| LTE 10 MHz EUTRA ACPR Lower | −32.5 | −32.68 |
| LTE 10 MHz EUTRA ACPR Upper | −32.5 | −32.8 |

It can be seen that results are in close agreement indicating that estimation according to techniques described above may be used to provide accurate adjacent channel power values.

With one set of extracted polynomial coefficients (e.g. values of A(1) to A(5)), other modulated waveforms may be estimated without any further data collection using one or more additional weight matrix that may be calculated offline. Thus, a weight factor storage such as weight factor storage 516 may store various different weight factors corresponding to different waveforms and/or frequencies. These weight factors may be applied as required to obtain ACPR values for a range of different signals and frequencies without requiring separate testing using source signals of different waveforms and frequencies. This may provide a significant time saving.

In a process as described above, the receiver should generally be kept linear so that its own non-linear contribution is negligible compared to the transmit path (e.g. receiver 462 kept linear so that contribution of receiver 462 is negligible compared to contribution of transmitter 438). In addition, the receiver noise should generally be kept low so that the impact on test time is minimized. Also, bandwidth of the receiver should generally be set much wider than the transmitter bandwidth so that the receiver only introduces a delay to the transmitter signal and does not significantly affect the signal otherwise (e.g. bandwidth of receiver 462 set wider than bandwidth of transmitter 438).

Aspects of the methods described in the above examples can be used to test the complete transceiver path, or one or more portions of the path. For example, to test the transceiver alone, the transceiver and the power amplifier (PA), the transceiver, power amplifier, and filter, or the PA alone, or any combination of one or more component for which non-linearity measurement may be desired.

The above examples are generally based on assuming that effects of LPFs may be ignored, i.e. that they may be considered wide open filters that do not affect signals at or close to the frequencies of interest (e.g. main channel 204 and adjacent channels 206, 208 of FIG. 2). Thus, LPFs 434, 436 in transmitter 438 of FIG. 4B may be considered wide open filters, i.e. they only create delay to the in-band signal. In cases where this assumption is not valid, e.g. where such an LPF has noticeable amplitude droop and/or group delay variation within the passing band, a LPF model can be applied to a source signal (e.g. two-tone signal) to take into account the effects of the LPF so that a source signal (i.e. signal corresponding to "in" in Eq. 1) may correspond to the output of the LPF instead of the input of the LPF. Applying such an LPF model is an example of applying one or more corrective steps to correct for filtering in the transceiver.

A new reference signal (i.e. new signal replacing "in" in Eq. 1 to account for effects of LPF) may be defined as:

$$\text{in}_{lpf} = H_{lpf}(\text{in}) \qquad \text{Eq. 9}$$

Where $H_{lpf}$ is the LPF filtering function.

For transceiver input LPF response for in-band signal, typically a few taps of a Finite Impulse Response (FIR) filter may be sufficient to represent the filter $H_{lpf}$. Thus, Eq. 9 may be rewritten as:

$$\text{in}_{lpf} = H_{lpf}(\text{in}) = \sum_{i=0}^{K-1} h_i * \text{in}(t - i*\tau) \qquad \text{Eq. 10}$$

Where K is the FIR filter number of taps.

Replacing the signal in with $\text{in}_{lpf}$ in Eq. 6, the power in the main channel, adjusted for effects of the LPF may be given by:

$$\text{out}_{tx} * \text{out}_{tx}^* = \sum_{n1=1}^{N} \sum_{n2=1}^{N} \left( A(n1) * A(n2)^* * \sum_{i=0}^{K-1} h_i * Xtr_{n1}(t - i*\tau) * \sum_{j=0}^{K-1} h_j * Xtr_{n2}^H(t - j*\tau) \right)$$

This can be rewritten as:

$$\text{out}_{tx} * \text{out}_{tx}^* = \sum_{n1=1}^{N} \sum_{n2=1}^{N} \sum_{i=0}^{K-1} \sum_{j=0}^{K-1} [A(n1) * A(n2)^* h_i * Xtr_{n1}(t - i*\tau) h_j * Xtr_{n2}^H(t - j*\tau)] \qquad \text{Eq. 11}$$

Similarly, Eq. 7 may be modified to account for the effects of an LPF to give the following expression for adjacent channel power:

$$\text{out}_{acp} * \text{out}_{acp}^* = \qquad \text{Eq. 12}$$
$$\sum_{n1=1}^{N} \sum_{n2=1}^{N} \sum_{i=0}^{K-1} \sum_{j=0}^{K-1} [A(n1) * A(n2)^* h_i * Xacp_{n1}(t - i*\tau)$$
$$h_j * Xacp_{n2}^H(t - j*\tau)]$$

An ACPR value can be calculated from out$_{tx}$*out$_{tx}$*, and out$_{acp}$*out$_{acp}$* using the values from equations 11 and 12 in equation 8.

Characteristics of such filters, such as FIR filter tap values h$_i$, may be pre-determined through lab characterization (which may provide a simpler approach) or may be obtained through a correlation method for each device under test (this may provide a more accurate and more complicated approach) as shown below, in which an LPF is the filter under test (i.e. the effects of the LPF are to be accounted for to obtain more accurate ACPR). An output signal that has passed through a receiver may be measured and then h$_i$ estimation may be done through correlation and least mean square fit as follows:

Substituting the term "in" of Eq. 1 with the term "in$_{lpf}$" of Eq. 10, the output signal, corrected for effects of an LPF, can be written as:

$$\text{Out} = A(1) * \sum_{i=1}^{K} h_i * \text{in} + A(2) * \left| \sum_{i=1}^{K} h_i * \text{in} \right|^2 * \sum_{i=1}^{K} h_i * \text{in} + \ldots \quad \text{Eq. 13}$$

Multiplying the Output signal (Out) with the conjugate of input signal (in*) gives:

$$\text{Out} * \text{in}^* = A(1) * \left\{ \sum_{i=1}^{K} h_i * \text{in} \right\} * \text{in}^* + \quad \text{Eq. 14}$$

$$A(2) * \left\{ \left| \sum_{i=1}^{K} h_i * \text{in} \right|^2 * \sum_{i=1}^{K} h_i * \text{in} \right\} * \text{in}^* + \ldots$$

During this measurement, reducing the transceiver input level for small signal response, means Eq. 14 becomes:

$$\text{Out} * \text{in}^* = A(1) * \left\{ \sum_{i=1}^{K} h_i * \text{in} \right\} * \text{in}^* = A(1) * \sum_{i=1}^{K} h_i * \text{in} * \text{in}^* \quad \text{Eq. 15}$$

With A(1) known and applying a least mean square (LMS) fit to Eq. 15, the FIR filter taps h$_i$ can be estimated. To capture the complete in-band LPF behavior, the input signal (in Eq. 13, 14, 15) may be set to cover the full bandwidth of the intended test mode, e.g. multi-tone signal or full RB modulated LTE signal etc. In addition, to avoid distortion from components after a power amplifier (e.g. from filter 452 or any duplexer associated with sampling to obtain signal 456 after PA 450) when doing the h$_i$ estimation, the signal directly from the output of a power amplifier may be used. The source signal can be set in the middle of the transmitter band so that component response (e.g. duplexer response) may be mostly a simple delay.

While the above description is based on a memory-less non-linearity model, a more complex memory non-linearity model may be applied if the transmitter system does have non-negligible memory effect. Aspects of a non-limiting example of such a model are described here.

A memory polynomial model of a non-linear system can be written as:

$$\text{out}(t) = \sum_{j=0}^{M-1} \sum_{i=1}^{N} A_{ji} * f_n(\text{in}(t - j * \Delta)) \quad \text{Eq. 16}$$

Where: N is the total number of distortion terms; A$_{ji}$ is the corresponding coefficients; M is the memory depth; and $f_n(\text{in}(t-j*\Delta))$ is the distortion term function, which is similar to the function $f_n(\text{in})$ of Eq. 2. Equation 16 may be considered a more generalized version of Equation 2, taking into account memory effects for a memory depth M. For memory depth M=1 the outer summation of Equation 16 is removed leaving the inner summation of terms like Equation 2.

FIG. 7 illustrates an example of a method that includes receiving an evaluation signal from a transceiver 700, such as transceiver 422, and calculating a plurality of polynomial coefficients for a polynomial expression corresponding to the evaluation signal 702. The method further includes applying a set of first weight factors to the plurality of polynomial coefficients to obtain a main channel power 704 and applying a set of second weight factors to the plurality of polynomial coefficients to obtain an adjacent channel power 706, for example, weight factors from weight factor storage 516. The method further includes calculating an Adjacent Channel Power Ratio (ACPR) value from a ratio of the adjacent channel power to the main channel power, e.g. ACPR calculator 514 calculating an ACPR value, and operating the transceiver according to the ACPR value, e.g. providing an output signal such as output signal 522, which may be used to categorize the transceiver, or modify operation of the transceiver.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

What is claimed is:

1. An apparatus for testing a circuit, comprising:
a source signal input configured to receive a source signal;
an evaluation signal input configured to receive an evaluation signal;
a coefficient extractor configured to extract a plurality of polynomial coefficients representing the evaluation signal and the source signal;
a weight factor storage containing a plurality of weight factors corresponding to frequency filters; and
an Adjacent Channel Power Ratio (ACPR) calculator configured to calculate an ACPR value from the evaluation signal and the source signal by applying the plurality of weight factors from the weight factor storage to the plurality of coefficients the plurality of weight factors selected according to a main channel frequency range and an adjacent channel frequency range and
configured to determine whether the ACPR value is within an acceptable range and generating a corresponding indication.

2. The apparatus of claim 1 wherein the evaluation signal input is coupled to receive the evaluation signal from an output of a transceiver circuit located on a die, and wherein the coefficient extractor, the weight factor storage, and the ACPR calculator are formed on the die.

3. The apparatus of claim 1 further comprising a time alignment circuit configured to provide time alignment between the source signal from the source signal input and the evaluation signal from the evaluation signal input and to provide time-adjusted signals to the coefficient extractor.

4. The apparatus of claim 1 further comprising a comparison circuit configured to compare the ACPR value from the ACPR calculator with an ACPR threshold.

5. The apparatus of claim 1 wherein the plurality of weight factors include a first set of weight factors corresponding to a main channel and a second set of weight factors corresponding to an adjacent channel.

6. The apparatus of claim 5 wherein the ACPR calculator is configured to calculate the ACPR value by applying the first set of weight factors to the plurality of coefficients to obtain main channel power, apply the second set of weight factors to the plurality of coefficients to obtain adjacent channel power, and to calculate the ACPR value from a ratio of the adjacent channel power to the main channel power.

7. The apparatus of claim 1 further comprising a two-tone source signal generator connected to the source signal input to provide a two-tone source signal to the source signal input, the two-tone source signal generator further coupled to provide the two-tone source signal to a transceiver input of a transceiver, an output of the transceiver coupled to provide the evaluation signal to the evaluation signal input.

8. The apparatus of claim 7 wherein the two-tone source signal generator is configured to provide the two-tone source signal with a first tone at a first frequency and a second tone at a second frequency, the ACPR calculator configured to calculate the ACPR value for a main channel extending between the first frequency and the second frequency.

9. The apparatus of claim 7 wherein the transceiver includes a transmitter and a receiver, the transceiver input connected to an input of the transmitter, an output of the transmitter coupled to an input of the receiver, and an output of the receiver connected to provide the evaluation signal to the evaluation signal input.

10. The apparatus of claim 7 wherein the transceiver is formed of one or more analog circuits, the two-tone source signal generator is formed of one or more digital circuits coupled to the transceiver through one or more digital-to-analog converters, and the ACPR calculator is formed of one or more digital circuits coupled to the transceiver through one or more analog-to-digital converters.

11. An apparatus for testing a circuit, comprising:
a transceiver having a transceiver input and a transceiver output;
a two-tone source coupled to the transceiver input; and
an adjacent channel power ratio (ACPR) estimator coupled to the transceiver output and coupled to the two-tone source, the ACPR estimator
configured to calculate coefficients of a polynomial representation of an output signal of the transceiver output, to apply stored weight factors to the coefficients to calculate an ACPR value the stored weight factors corresponding to a main channel frequency range and an adjacent channel frequency range, and
configured to determine whether the ACPR is within an acceptable range and generate a corresponding indicator.

12. The apparatus of claim 11 wherein the two-tone source and the ACPR estimator are formed on a transceiver die that includes the transceiver, the two-tone source and the ACPR estimator coupled to the transceiver as Built-In-Self-Test (BIST) circuits of the transceiver die.

13. The apparatus of claim 12 wherein the transceiver is formed in an analog portion of the transceiver die and the two-tone source and the ACPR estimator are formed in a digital portion of the transceiver die.

14. The apparatus of claim 11 wherein the transceiver includes a transmitter and a receiver, the transmitter has an output coupled through a switch to an input of the receiver to switchably couple a transmitter output signal to the input of the receiver.

15. The apparatus of claim 11 further comprising a pass/fail determination circuit coupled to the ACPR estimator, the pass/fail determination circuit configured to compare the ACPR value from the ACPR estimator with a threshold and to designate the transceiver as failed when the ACPR value is below the threshold.

16. A method of testing a circuit comprising:
receiving an evaluation signal from a transceiver;
calculating a plurality of polynomial coefficients for a polynomial expression corresponding to the evaluation signal;
selecting a set of first weight factors according to a main channel frequency range;
applying the set of first weight factors to the plurality of polynomial coefficients to obtain a main channel power;
selecting a set of second weight factors according to an adjacent channel frequency range;
applying the set of second weight factors to the plurality of polynomial coefficients to obtain an adjacent channel power;
calculating an Adjacent Channel Power Ratio (ACPR) value from a ratio of the adjacent channel power to the main channel power; and
determining whether the ACPR value is within an acceptable range and generating a corresponding indicator.

17. The method of claim 16 wherein determining whether the ACPR value is within an acceptable range includes comparing the ACPR value with a threshold and categorizing the transceiver accordingly into a category from a plurality of categories that includes at least: pass and fail.

18. The method of claim 17 further comprising categorizing the transceiver into a fail category according to the ACPR value above the threshold and in response discarding the transceiver.

19. The method of claim 17 further comprising categorizing the transceiver into a pass category according to the ACPR value below the threshold and subsequently incorporating the transceiver in an assembly.

20. The method of claim 16 further comprising applying one or more corrective steps to correct for filtering in the transceiver.

* * * * *